(12) United States Patent
Kim et al.

(10) Patent No.: US 11,073,445 B2
(45) Date of Patent: Jul. 27, 2021

(54) APPARATUS FOR TESTING ENDURANCE OF BRAKE HOSE

(71) Applicant: HS R & A Co., Ltd., Gyeongsangnam-do (KR)

(72) Inventors: Younkyou Kim, Gyeongsangnam-do (KR); Jaehong Lee, Gyeongsangnam-do (KR)

(73) Assignee: HS R & A Co., Ltd., Gyeongsangnam-do (KR)

( * ) Notice: Subject to any disclaimer, the term of this patent is extended or adjusted under 35 U.S.C. 154(b) by 350 days.

(21) Appl. No.: 16/297,139

(22) Filed: Mar. 8, 2019

(65) Prior Publication Data

US 2019/0277728 A1 Sep. 12, 2019

(30) Foreign Application Priority Data

Mar. 12, 2018 (KR) .................. 10-2018-0028420

(51) Int. Cl.
*G01M 17/007* (2006.01)
*B33Y 80/00* (2015.01)
*B60T 17/04* (2006.01)
*G01M 13/00* (2019.01)
*G01N 3/00* (2006.01)
(Continued)

(52) U.S. Cl.
CPC .......... *G01M 17/007* (2013.01); *B33Y 50/00* (2014.12); *B33Y 80/00* (2014.12); *B60T 17/043* (2013.01);
(Continued)

(58) Field of Classification Search
None
See application file for complete search history.

(56) References Cited

U.S. PATENT DOCUMENTS

| 9,638,613 | B2 * | 5/2017 | Chapman | G01N 3/12 |
| 10,006,843 | B2 * | 6/2018 | Kuroda | G01N 3/20 |
| 2016/0003723 | A1 | 1/2016 | Chapman | |

FOREIGN PATENT DOCUMENTS

| CN | 205015214 U | 2/2016 |
| DE | 20208483 U1 | 9/2002 |

(Continued)

OTHER PUBLICATIONS

Office Action issued in Chinese Application No. 201910128953.9, dated Sep. 16, 2020, 7 pages.
(Continued)

*Primary Examiner* — Freddie Kirkland, III
(74) *Attorney, Agent, or Firm* — Devlin Law Firm LLC; James M. Lennon

(57) ABSTRACT

Disclosed is a brake hose endurance testing apparatus, including: a plurality of first fitting members inserted at one end of the brake hose into a plurality of first fixing brackets; a first mounting block attached to the plurality of first fixing brackets and configured to move up and down; a vertical driving unit configured to drive the first mounting block up and down; a second mounting block attached to a plurality of second fitting members inserted at the opposite end of the brake hose into a plurality of second fixing brackets or attached and fixed to moving brackets; and a horizontal driving unit configured to drive the moving brackets to move left and right, wherein the first and second fitting members of the brake hose are universal fitting members laid out to reflect the interference characteristics between the brake hose and peripheral components.

7 Claims, 9 Drawing Sheets

(51) Int. Cl.
    *G01N 3/26* (2006.01)
    *B33Y 50/00* (2015.01)
(52) U.S. Cl.
    CPC .............. *G01M 13/00* (2013.01); *G01N 3/00* (2013.01); *G01N 3/26* (2013.01); *G01N 2203/00* (2013.01); *G01N 2203/02* (2013.01)

(56) References Cited

FOREIGN PATENT DOCUMENTS

| JP | H09-178603 A | 7/1997 |
| JP | 2005-088692 A | 4/2005 |
| KR | 20-1999-0002957 U | 1/1999 |
| KR | 2009-0057496 A | 6/2009 |
| KR | 10-2015-0098695 A | 8/2015 |
| KR | 10-1574287 B1 | 12/2015 |

OTHER PUBLICATIONS

English Translation of Office Action issued in Chinese Application No. 201910128953.9, dated Sep. 16, 2020, 7 pages.
Notification of Decision to Grant issued in Korean Application No. 10-2018-0028420, dated Aug. 19, 2019, 2 pages.
European Extended Search Report issued in EP Application No. 19161505.3, dated Jul. 23, 2019, 9 pages.
Office Action issued in Korean Application No. 10-2018-0028420, dated Mar. 11, 2019, 9 pages.
English translation of Office Action issued in Korean Application No. 10-2018-0028420, dated Mar. 11, 2019, 9 pages.

\* cited by examiner

APPARATUS FOR TESTING ENDURANCE OF BRAKE HOSE

CROSS-REFERENCE TO RELATED APPLICATION(S)

This application is based on and claims priority under 35 U.S.C. § 119 to Korean Patent Application No. 10-2018-0028420, filed on Mar. 12, 2018, in the Korean Intellectual Property Office, the disclosure of which is incorporated by reference herein in its entirety.

BACKGROUND

1) Field

The disclosure relates to an apparatus for testing endurance of a brake hose, and more specifically, to an apparatus for testing endurance of a brake hose, which can perform an endurance test of a brake hose by reflecting the interference characteristics between a brake hose equipped with universal fitting members, which are predicted and preset according to a layout setting of the brake hose, and peripheral components.

2) Description of Related Art

The above information is presented as background information only to assist with an understanding of the present disclosure. No determination has been made, and no assertion is made, as to whether any of the above might be applicable as prior art with regard to the present disclosure.

In general, vehicles, such as passenger cars, employ a hydraulic brake that generates braking force by supplying hydraulic oil stored in a master cylinder to a wheel cylinder provided in a wheel in response to the operation of a brake pedal.

In order to increase the braking force, the rear wheels of a vehicle are provide with, among the hydraulic brakes, a drum type brake in which a wheel cylinder allows a brake shoe to come into close contact with a drum according to the action of the hydraulic oil, thereby generating braking force.

In addition, the front wheels of a vehicle are applied with a disk type brake in which brake pads attached to the front ends of wheel cylinders press both sides of a disk according to the action of the hydraulic oil.

Here, the brake hose serves as a passage for feeding the hydraulic oil from the master cylinder to the wheel cylinder.

The brake hose must be stably fixed in a position where it can avoid interference with surrounding devices or components. To this end, there is a growing demand for brake hose assemblies which are capable of stably fixing the brake hose and are easily assembled.

Thus, the applicant has proposed a vehicle brake hose assembly that facilitates the assembly of components for fixing the brake hose in Korean Patent No. 10-1624516 (registered on May 20, 2016).

In addition, since the brake hose must be stably installed without being shaken and without causing interference with other surrounding components, an interference test with peripheral components is conducted. The conventional interference test of a brake hose was performed by, when the design of a brake hose is completed, installing the brake hose in the actual vehicle and checking whether or not the brake hose interferes with the peripheral components while the vehicle is running.

To this end, a layout setting of the brake hose is performed, and if the brake hose interferes with the peripheral components during the test for the layout setting, the brake hose is removed, redesigned, and remounted for a subsequent test, so that it takes a long time to manufacture the brake hose and the manufacturing cost is increased.

In order to solve the above problem, the applicant has proposed a system and a method for setting the layout of a brake hose in which the brake hose layout setting can be accurately performed by predicting interference characteristics between the brake hose and peripheral components in Korean Patent No. 10-1574287 (registered on Nov. 27, 2015).

After the vehicle brake hose assembly equipped with components for fixing the brake hose and the layout obtained by predicting the interference characteristic between the brake hose and the peripheral components are completed as described above, an endurance test is performed on the brake hose product.

However, the conventional endurance test for the brake hose further takes time and expense to manufacture a brake hose product by reflecting a result of the layout and sub-products for making the product or to manufacture a jig or fitting members for attaching the product or the sub-products to an endurance tester.

SUMMARY

The disclosure has been made in order to solve the problems above, and an aspect of the disclosure provides an apparatus for testing endurance of a brake hose, which reflects a layout result to universal fitting members for fixing the brake hose, thereby testing endurance of the brake hose having the universal fitting members attached thereto.

In accordance with an aspect, an apparatus for testing endurance of a brake hose according to an aspect of the disclosure may include: a plurality of first fixing brackets into each of which a first fitting member provided at one end of the brake hose is inserted; a first mounting block configured to have the plurality of first fixing brackets attached thereto and configured to move up and down; a vertical driving unit configured to drive the first mounting block to move up and down; a second mounting block to which a plurality of second fixing brackets into each of which a second fitting member provided at the opposite end of the brake hose is inserted or moving brackets are attached and fixed; and a horizontal driving unit configured to drive the moving brackets to move left and right, wherein the first and second fitting members of the brake hose are universal fitting members laid out to reflect the interference characteristics between the brake hose and peripheral components.

The second fitting member provided at the opposite end of the brake hose attached to a front wheel of a vehicle may be attached to the moving bracket, and the first fitting member provided at one end of the brake hose attached to a rear wheel of the vehicle may be attached to the second fixing bracket.

The first mounting block may include a bracket fixing plate to which the plurality of first fixing brackets are attached and an elevating shaft of the vertical driving unit, and the elevating shaft may move up and down a predetermined number of times by a predetermined distance due to the operation of the vertical driving unit.

The bracket fixing plate may further include a plurality of screw fastening holes such that the first fixing bracket can be selectively attached to different positions of the bracket fixing plate.

The second mounting block may include a plurality of vertical supports in a shaft shape for fixing brackets and a plurality of vertical shafts protruding from the interior of the vertical supports and having the second fixing brackets or the moving brackets attached thereto, and the vertical shafts having the moving brackets attached thereto may pivot left and right a predetermined number of times by a predetermined angle due to the operation of the horizontal driving unit.

A method for testing endurance of a brake hose according to another aspect of the disclosure may include the steps of: manufacturing fixing components of the brake hose using a 3D printer; mounting the fixing components of the brake hose manufactured by the 3D printer and testing the layout of the brake hose; scanning the layout of the brake hose to obtain layout data; comparing the layout data of the brake hose with peripheral-components data to determine whether or not there is an interfering component, thereby obtaining correction data on the interfering component; and if there is an interfering component, providing the corrected data to the 3D printer to remanufacture the fixing components of the brake hose, wherein the fixing components are first and second fitting members, a first fixing bracket, and a moving bracket, and wherein the first and second fitting members are used universally for the first fixing bracket and the moving bracket without distinguishing between the same according to a layout setting in which fastening surfaces of the first and second fitting members are formed at an angle based on angle data capable of preventing the occurrence of initial twist of the brake hose in implementation of the layout.

The first and second fitting members may have the same structure, and each of the fastening surfaces is formed at an angle capable of preventing the occurrence of initial twist of the brake hose in setting the layout.

The disclosure provides the following effects by means of the solution of problems mentioned above.

An apparatus for testing endurance of a brake hose according to embodiments of the disclosure can prevent the brake hose from twisting at the initial stage of the endurance test by setting and realizing, as a design value according to the layout, a fixing angle between a fitting member and a fixing component for fixing the same.

In addition, in the apparatus for testing endurance of a brake hose according to embodiments of the disclosure, since the fitting members, into which both ends of the brake hose are inserted, have the same structure, the fitting members can be universally used without distinguishing between the same, and since the fitting members are fastened in consideration of an operation range in the endurance test, it is possible to further facilitate the endurance test.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
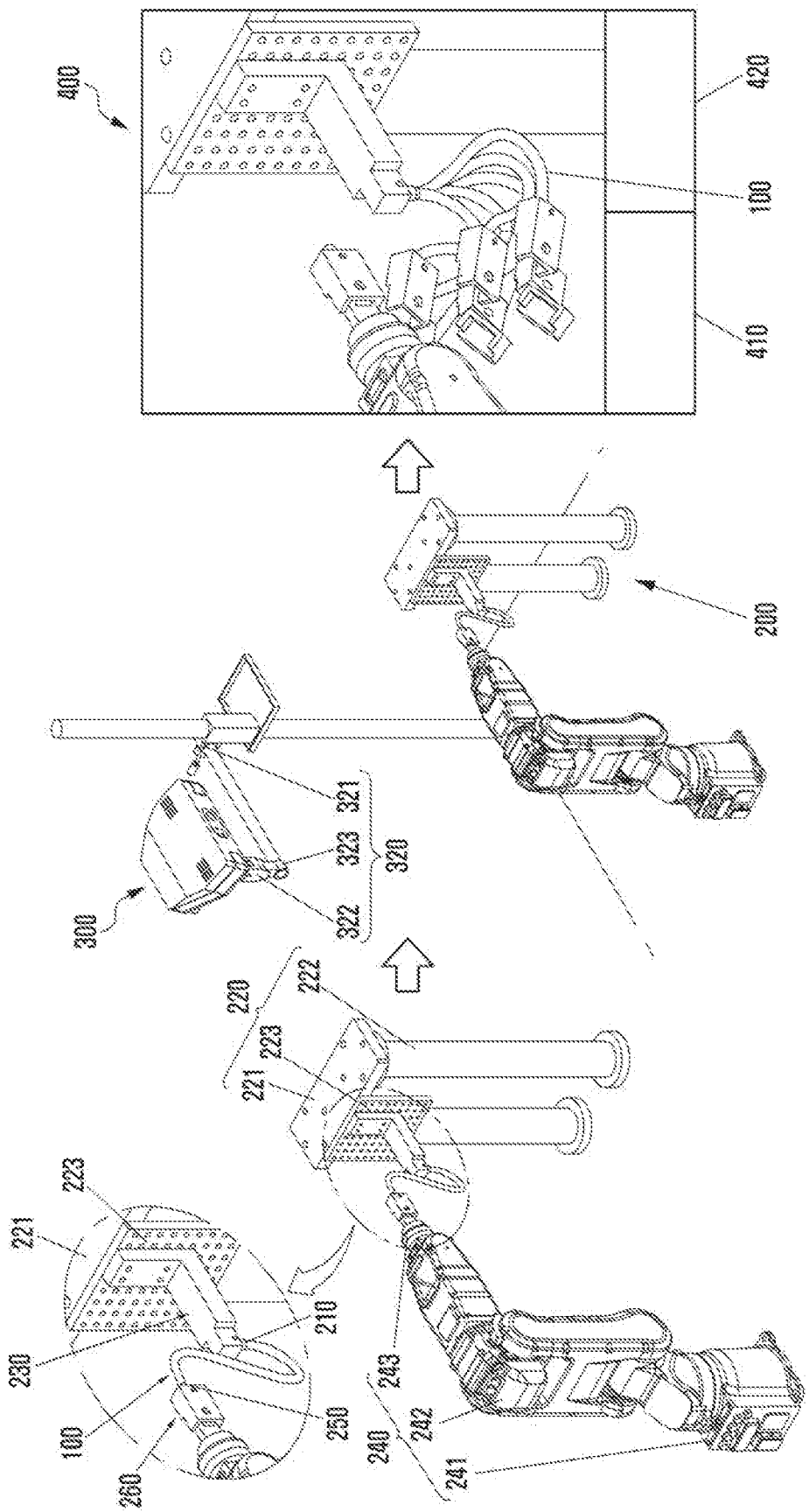
FIG. 1 is a schematic view schematically showing a layout setting system applied to an apparatus for testing endurance of a brake hose according to an embodiment of the disclosure.

Hereinafter, exemplary embodiments according to the present disclosure will be described in detail with reference to the accompanying drawings. Here, it is noted that identical reference numerals denote the same structural elements in the accompanying drawings. The detailed description of known functions and structures will be omitted to avoid an unclearness of the subject matter of the present disclosure.

Hereinafter, an apparatus for testing endurance of a brake hose according to an embodiment of the disclosure will be described with reference to the accompanying drawings.

Figure 2:
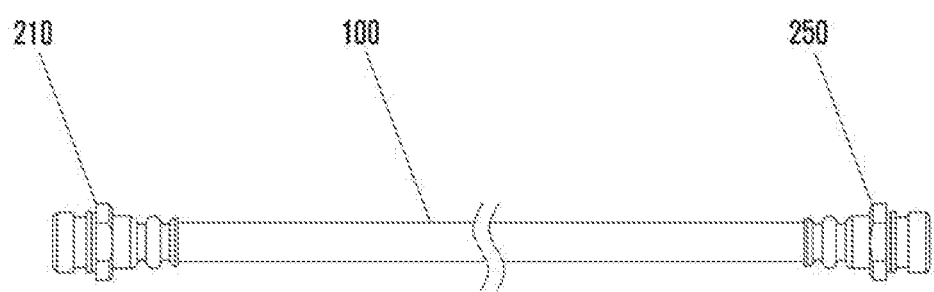
FIG. 2 is a plan view showing a brake hose having fitting members, which are reflected by the layout by the layout setting system in FIG. 1, inserted into the both ends thereof.
Figure 3:
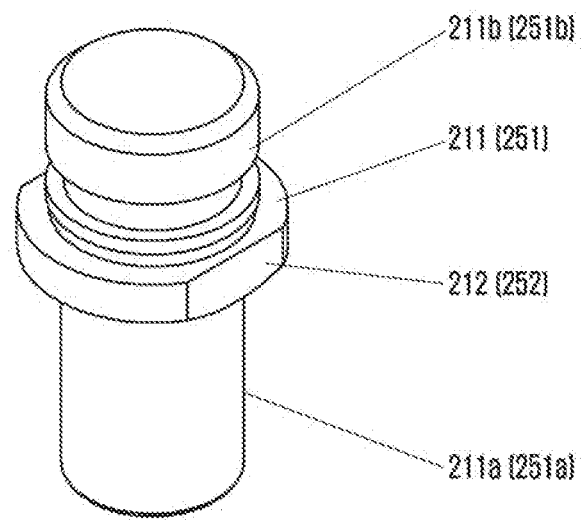
FIG. 3 is a perspective view showing the fitting member in FIG. 2.
Figure 4:
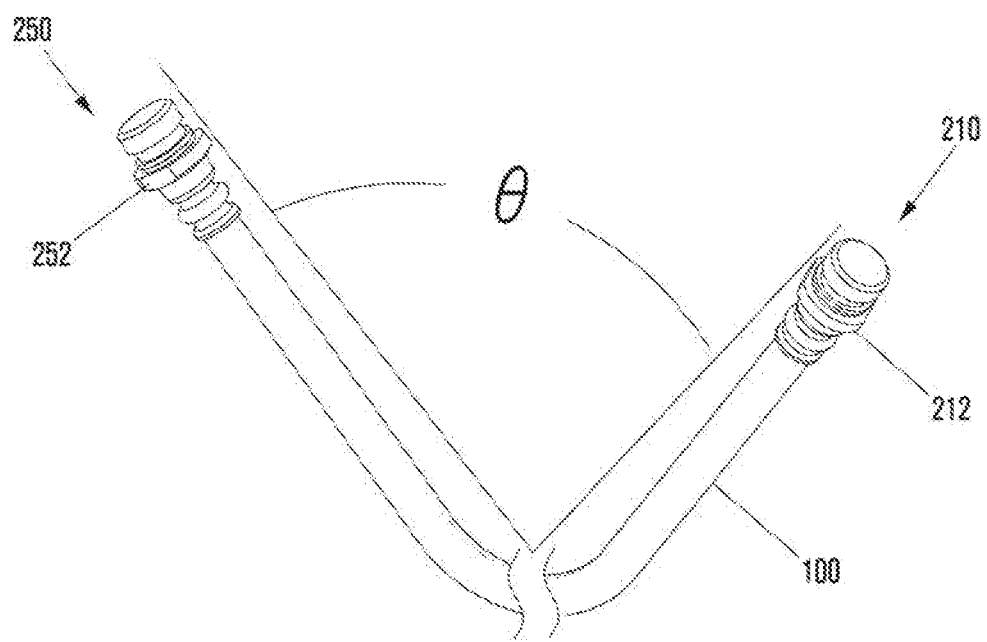
FIG. 4 is an exemplary view showing a predetermined design angle implemented by the fitting member in FIG. 2.
Figure 5:
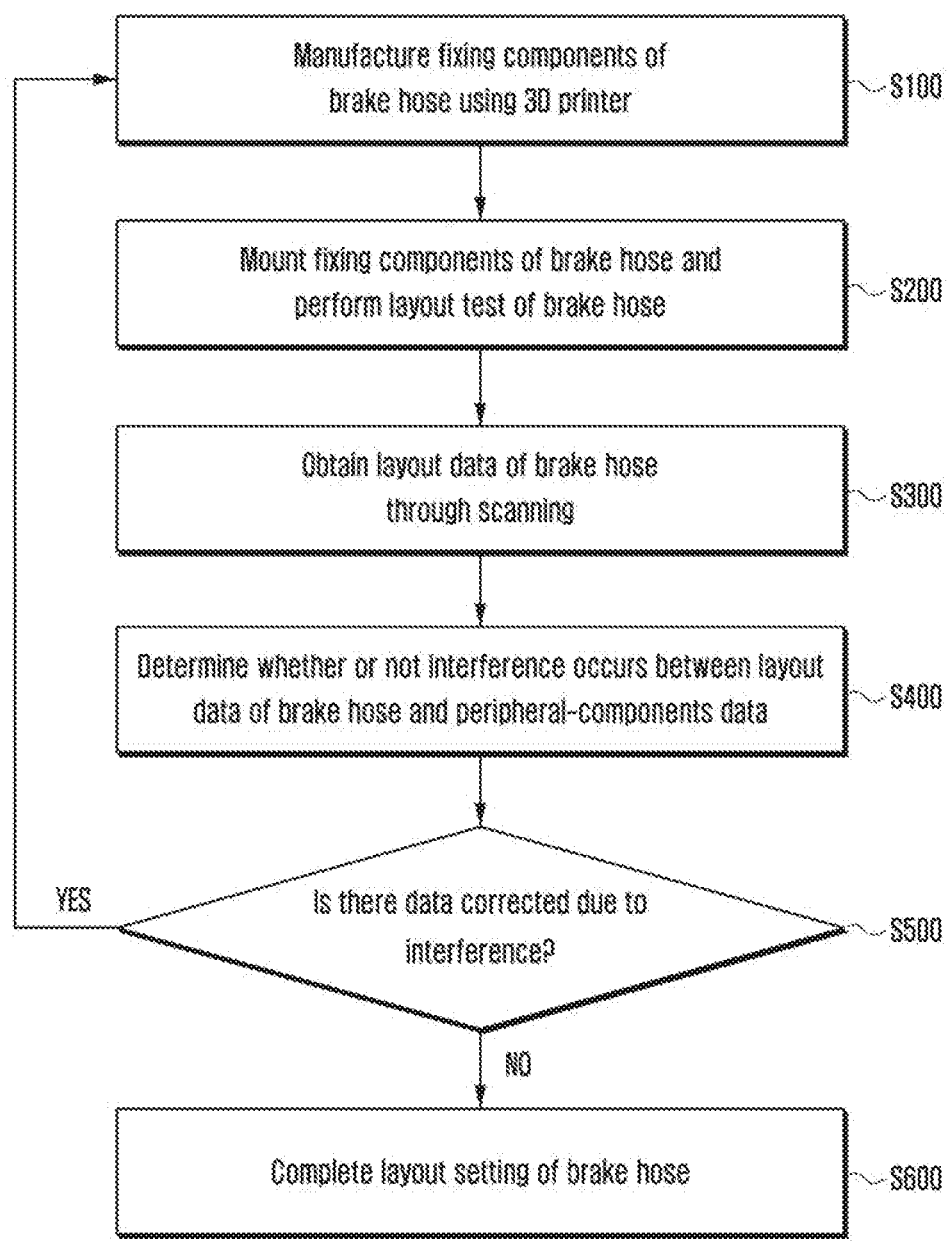
FIG. 5 is a flowchart schematically showing a layout setting method by the layout setting system in FIG. 1.
Figure 6A:
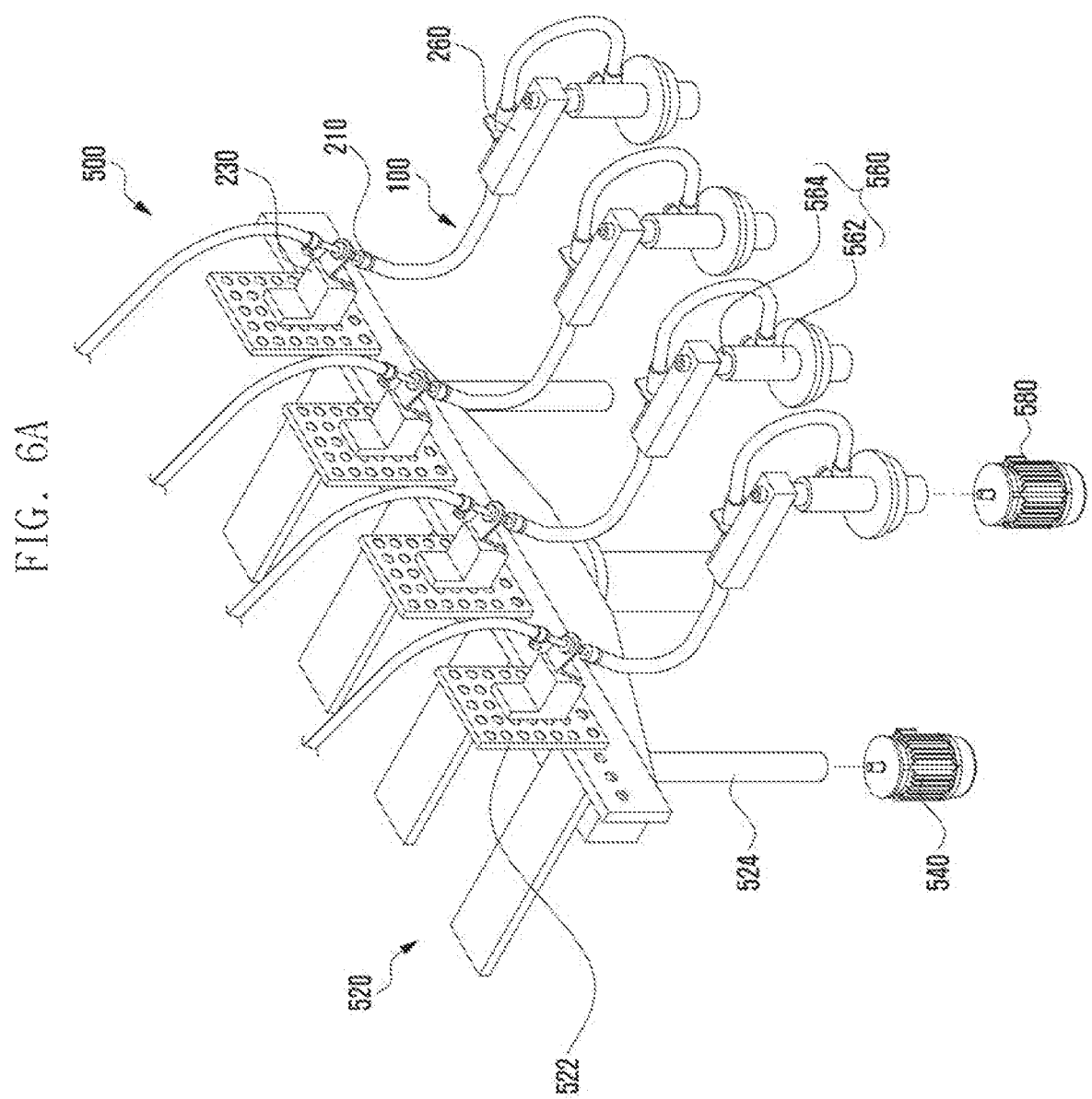
FIGS. 6A and 6B are operation diagrams of an apparatus for testing endurance of a brake hose, which is attached to a front wheel of a vehicle according to an embodiment of the disclosure.
Figure 6B:
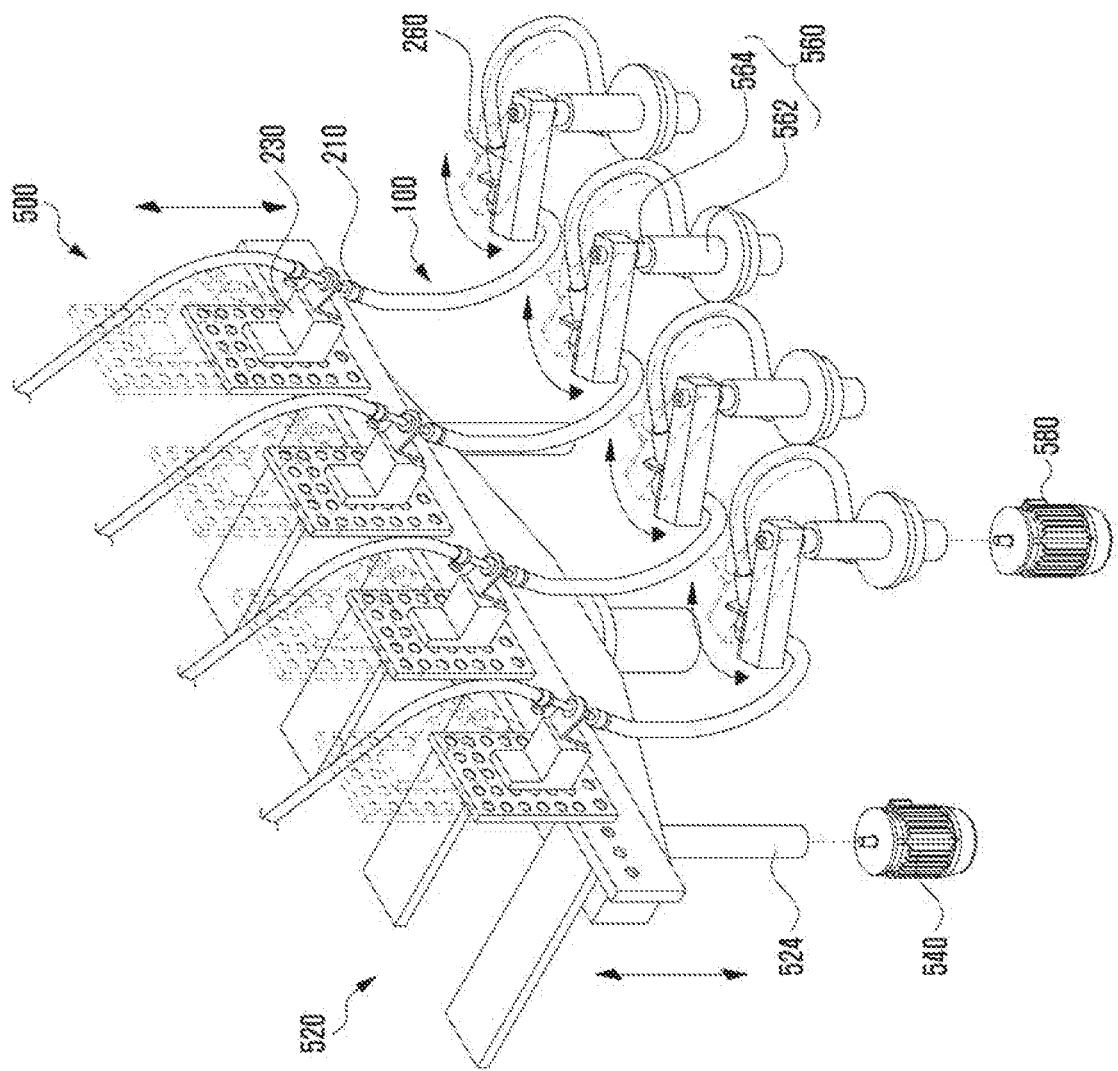
Figure 7A:
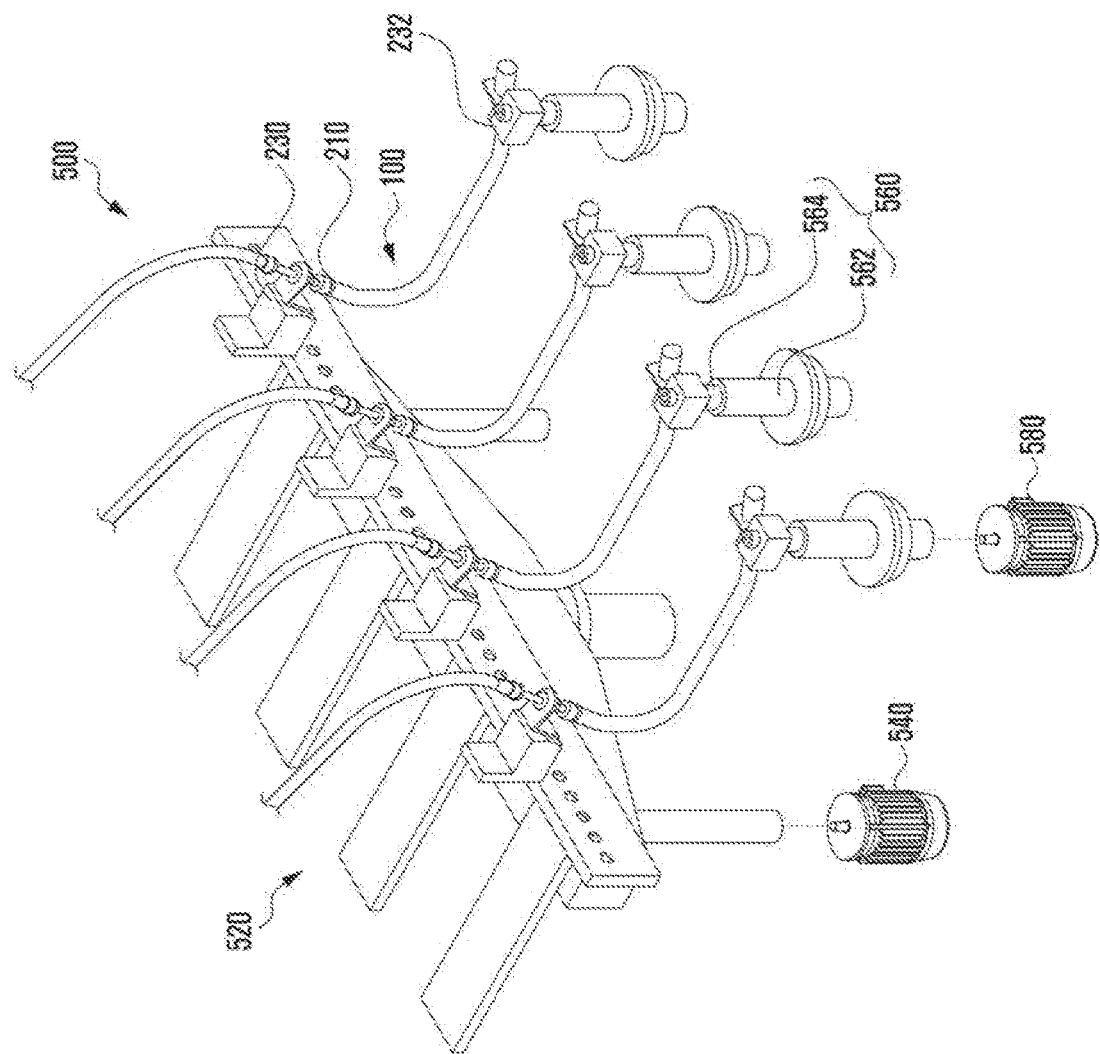
FIGS. 7A and 7B are operation diagrams of an apparatus for testing endurance of a brake hose, which is attached to a rear wheel of a vehicle according to an embodiment of the disclosure.
Figure 7B:
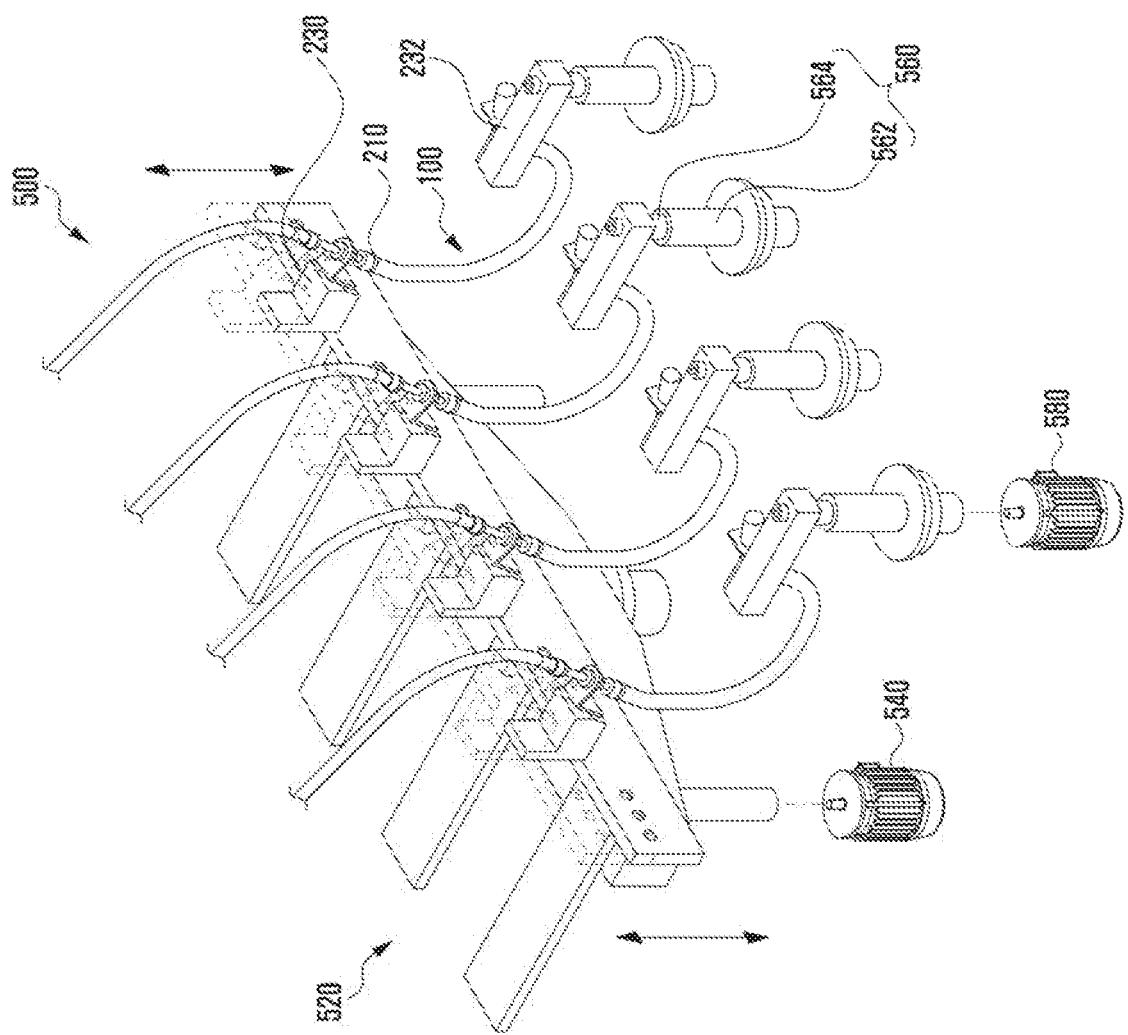

FIG. 1 schematically shows a layout setting system applied to an apparatus for testing endurance of a brake hose according to an embodiment of the disclosure, and FIG. 2 shows a brake hose having fitting members, which are reflected by the layout by the layout setting system in FIG. 1, inserted into the both ends thereof. FIG. 3 shows the fitting member in FIG. 2, and FIG. 4 shows a predetermined design angle implemented by the fitting member in FIG. 2.

First, a setting of the layout applied to an apparatus for testing endurance of a brake hose according to an embodiment of the disclosure will be described.

Referring to FIG. 1, a layout setting system applied to an apparatus for testing endurance of a brake hose according to the disclosure may include a testing unit 200, a scanner 300, and a controller 400.

As shown in FIG. 1, the testing unit 200 is provided to test the layout of a brake hose while equipped with brake hose fixing components manufactured using a 3D printer. The testing unit 200 may include a pair of first and second fitting members 210 and 250, which are fixing components to be mounted to the brake hose, a first fixing bracket 230, a moving bracket 260, a jig 220, and a robot unit 240.

As shown in FIG. 2, the first and second fitting members 210 and 250 may be coupled to both ends of the brake hose 100, respectively, by, for example, swaging.

As shown in FIG. 3, the first and second fitting members 210 and 250 may have the same structure and shape. The first fitting member 210 may include a coupling portion 211a coupled to one end of the brake hose 100, a locking piece 211b formed in the upper portion of the coupling portion 211a so as to be locked in an insertion hole (not shown) of the first fixing bracket 230, which will be described later, and a connecting portion 211 connecting the coupling portion 211a and the locking piece 211b with each other and having a greater diameter than the coupling portion 211a and the locking piece 211b. Similarly, the second fitting member 250 may also include a coupling portion 251a, a locking piece 251b to be locked in an insertion hole (not shown) of the moving bracket 260, and a connecting portion 251.

The connecting portions 211 and 251 of the first and second fitting members 210 and 250 may have fastening surfaces 212 and 252 formed by cutting both side thereof such that the locking pieces 211b and 251b of the first and second fitting members 210 and 250 are inserted and fastened to the insertion holes of the first fixing bracket 230 and the moving bracket 260, respectively. In this case, one end of the brake hose 100 may be inserted into the coupling portion 211a or 251a to then be fixed by screwing. It must be understood that the disclosure is not limited thereto and that any structure can be applied as long as it can fix one end of the brake hose 100 to the coupling portion 211a or 251a in addition to the screw-fastening structure described above.

The jig 220 may be provided to fix one end of the brake hose 100, and may include a jig body 221 constituting the body of the jig 220, column members 222 provided at the lower end of the jig body 221 so as to support the jig body 221, and a coupling member 223 attached to the front side of the jig body 221 in a vertical position so as to couple the first fixing bracket 230 thereto.

The robot unit 240 may be provided to move the brake hose 100 in a predetermined layout range while gripping a part of the brake hose 100, and may include a first driving unit 241, a second driving unit 242, and a gripper 243. In this case, the first driving unit 241 serves to move the brake hose 100 left and right, the second driving unit 242 serves to move the brake hose 100 up and down, and the gripper 243 serves to grip a part of the brake hose 100.

More specifically, if a driver rotates a steering wheel (not shown) in one direction during the driving of a vehicle, the wheels of the vehicle are directed to the left or right by a steering device (not shown) operated in conjunction with the operation of the steering wheel. The first driving unit 241 is provided to reproduce the state in which the brake hose 100 is operated in conjunction with the movement of the wheels that are operated left or right.

The second driving unit 242 is provided to reproduce the state in which the brake hose 100 moves up and down when the vehicle passes over protruding places, such as humps, such that the wheels of the vehicle bump into and rebound from the protruding places.

The first fixing bracket 230 is provided to fix the first fitting member 210 provided at one end of the brake hose 100 to the jig 220, and the moving bracket 260 is provided to fix the second fitting member 250 to the gripper 243 of the robot unit 240. The moving bracket 260 and the second fitting member 250 may be selectively inserted and coupled horizontally or vertically in consideration of the operation range of the robot unit 240 and the ease of photographing using the scanner 300.

The first fitting member 210 and the second fitting member 250 may be coupled to both ends of the brake hose 100, respectively, wherein the first fitting member 210 is coupled to the first fixing bracket 230 and the second fitting member 250 is coupled to the moving bracket 260 so as to form a predetermined design angle (0). In this case, the predetermined design angle formed by the fastening surfaces 212 and 252 may be angle data capable of preventing the occurrence of initial twist of the brake hose in implementation of the layout.

Therefore, in the layout setting, the system is configured such that the fastening surfaces 212 and 252 of the first and second fitting members 210 and 250 having the same structure correspond to locking surfaces (not shown) formed in the insertion holes of the respective brackets 230 and 260, so that the first and second fitting members 210 and 250 are coupled to the first fixing bracket 230 and the moving bracket 260 so as to have an angle to prevent the initial twist of the brake hose. Therefore, the fitting members can be used universally for the first fixing bracket 230 and the moving bracket 260 without distinguishing between the same.

Meanwhile, the pair of first and second fitting members 210 and 250, the first fixing bracket 230, and the moving bracket 260 may be manufactured using a 3D printer (not shown) that is connected to a PC (not shown) proving 3D data information on respective configurations, thereby producing 3D products. As a result, since it is possible to precisely manufacture respective configurations having desired shapes by simplifying the shapes of the first and second fitting members 210 and 250, the first fixing bracket 230, and the moving bracket 260, manufacturing time and costs can be reduced. Furthermore, since the fitting members 210 and 250 have the same structure, the fitting members 210 and 250 can be used universally for either end of the brake hose 100 without distinguishing from the same.

As described above, the coupling member 223 of the jig 220 and the locking piece 211b of the first fitting member 210 are fixed to the first fixing bracket 230. Then, one end of the brake hose 100 is inserted into and fixed to the coupling portion 211a of the first fitting member 210.

Next, the locking piece 251b of the second fitting member 250 is fixed to the moving bracket 260, and then the opposite end of the brake hose 100 is inserted into and fixed to the coupling portion 251a of the second fitting member 250.

Subsequently, the gripper 243 of the robot unit 240 is moved to be inserted into the rear surface of the moving bracket 230 to thus firmly grip the same, and then the robot unit 240 is operated. At this time, the robot unit 240 is operated within a predetermined layout range of the brake hose 100 to move the brake hose 100 left, right, up, and down, thereby performing the layout test of the brake hose 100.

Meanwhile, the scanner 300 may move a photographing unit using first to third moving units 321, 322, and 323 of a movement equipment 320, and may scan the layout of the brake hose 100, thereby obtaining layout data.

A storage unit 410 of the controller 400 stores the layout scan data information of the brake hose and data information on peripheral components. An input unit 420 inputs the layout scan data information and the peripheral-components data information, which are stored in the storage unit 410, or corrects the layout scan data information. A display displays, on the screen, the layout scan data information and the peripheral-components data information, which are input by means of the input unit.

In other words, a layout setting method of a brake hose may include: a step S100 of manufacturing fixing components of a brake hose 100 using a 3D printer; a step S200 of mounting the fixing components of the brake hose 100, which are manufactured by the 3D printer, and then testing the layout of the brake hose 100; a step S300 of scanning the layout of the brake hose 100 to obtain layout data; a step S400 of comparing the layout data of the brake hose with peripheral-components data to determine interference therebetween and obtaining correction data on an interfering component; a step S500 of, if there is an interfering component, providing the corrected data to the 3D printer to remanufacture the fixing components of the brake hose 100; and a step S600 of, if there is no interfering component, completing the layout setting of the brake hose 100.

The layout of the brake hose 100 may be correctly set by repeating above processes.

According to the above-described layout, the apparatus for testing endurance of a brake hose according to the disclosure can be designed to satisfy user requirement standards by reflecting the interference characteristics between the brake hose and the peripheral components in advance. In addition, the fitting members into which both ends of the brake hose are inserted can be used universally without distinguishing between the same, thereby facilitating the coupling thereof. Furthermore, the apparatus can perform an endurance test of a brake hose by selecting the moving bracket in consideration of the operation range of the robot unit and the ease of photographing using the scanner.

FIGS. 6A, 6B, 7A, and 7B show the operation of an apparatus for testing endurance of a brake hose, which is attached to front and rear wheels of a vehicle, respectively, according to an embodiment of the disclosure.

Referring to FIGS. 6A, 6B, 7A, and 7B, an apparatus 500 for testing endurance of a brake hose according to an embodiment includes: a plurality of first fixing brackets 230 into each of which a first fitting member 210 provided at one end of the brake hose 100 is inserted; a first mounting block 520 configured to have the plurality of first fixing brackets 230 attached thereto and configured to move up and down; a vertical driving unit 540 configured to drive the first mounting block 520 to move up and down; a second mounting block 560 to which a plurality of second fixing brackets 232 into each of which a second fitting member 250 (not shown) provided at the opposite end of the brake hose 100 or moving brackets 260 are attached and fixed; and a horizontal driving unit 580 configured to drive the moving brackets 260 to move left and right.

The first and second fitting members 210 and 250 of the brake hose are universal fitting members laid out so as to reflect the interference characteristics between the brake hose 100 and peripheral components.

In the case where the brake hose 100 is attached to the front wheel of a vehicle, the second fitting member 250 provided at the opposite end of the brake hose 100 may be attached to the moving bracket 260 as the front wheel of the vehicle is steered. In the case where the brake hose 100 is attached to the rear wheel of a vehicle, since the rear wheel of the vehicle is not steered, the first fitting member 210 provided at one end of the brake hose 100 may be attached to the second fixing bracket 232.

The first mounting block 520 may include a bracket fixing plate 522 having a plurality of first fixing brackets 230 attached to the front surface thereof and an elevating shaft 524 attached to the lower surface of the bracket fixing plate 522. The elevating shaft 524 moves up and down a predetermined number of times and by a predetermined distance due to the operation of the vertical driving unit 540, which is a driving motor or a cylinder connected to move the elevating shaft 524 up and down, such that one end of the brake hose 100, which is fixed to the first fixing bracket 230, moves up and down, thereby testing endurance of the brake hose 100. A plurality of screw fastening holes may be formed in the bracket fixing plate 522, so that the first fixing bracket 230 may be selectively attached to different positions in the bracket fixing plate 522.

The second mounting block 560 may include a plurality of vertical supports 562 in a shaft shape for second fixing brackets and a plurality of vertical shafts 564 protruding from the interior of the vertical supports 562 and having the second fixing brackets 232 or the moving brackets 260 attached thereto. The horizontal driving unit 580 including a driving motor or a cylinder may be coupled so as to pivot the vertical shafts 564 left and right.

In the endurance test for the brake hose 100 attached to the front wheel of a vehicle, the moving bracket 260 is attached to the vertical shaft 564, and the vertical shaft 564 may be pivoted left and right a predetermined number of times and by a predetermined angle due to the operation of the horizontal driving unit 580. Accordingly, one end of the brake hose 100, which is fixed to the first fixing bracket 230, moves up and down a predetermined number of times due to the operation of the vertical driving unit 540, and the opposite end of the brake hose 100, which is fixed to the moving bracket 260, moves left and right a predetermined number of times and by a predetermined angle due to the operation of the horizontal driving unit 580 that is a driving motor or a cylinder, thereby testing endurance of the brake hose 100.

As described above, according to an apparatus for testing endurance of a brake hose of the disclosure, it is possible to prevent the brake hose from twisting at the initial stage of the endurance test by setting and realizing, as a design value according to the layout, a fixing angle between a fitting member and a fixing component for fixing the same. In addition, according to an apparatus for testing endurance of a brake hose of the disclosure, since the fitting members, into which both ends of the brake hose are inserted, have the same structure, the fitting members can be used universally without distinguishing between the same, and since the fitting members are fastened in consideration of an operation range thereof during the endurance test, it is possible to further facilitate the endurance test.

While the disclosure has been described with reference to embodiments thereof, it must be understood that the disclosure is not limited thereto, and various modifications and changes of the disclosure may be made within the scope of the disclosure.

What is claimed is:

1. An apparatus for testing endurance of a brake hose, comprising:
    a plurality of first fixing brackets into each of which a first fitting member provided at one end of the brake hose is inserted;
    a first mounting block configured to have the plurality of first fixing brackets attached thereto and configured to move up and down;
    a vertical driving unit configured to drive the first mounting block to move up and down;
    a second mounting block to which a plurality of second fixing brackets into each of which a second fitting member provided at the opposite end of the brake hose is inserted or moving brackets are attached and fixed; and
    a horizontal driving unit configured to drive the moving brackets to move left and right,
    wherein the first and second fitting members of the brake hose are universal fitting members laid out to reflect the interference characteristics between the brake hose and peripheral components,
    wherein the second mounting block comprises a plurality of vertical supports in a shaft shape for fixing brackets and a plurality of vertical shafts protruding from the interior of the vertical supports and having the second fixing brackets or the moving brackets selectively attached thereto, and wherein the vertical shafts having the moving brackets attached thereto pivot left and right a predetermined number of times and by a predetermined angle due to the operation of the horizontal driving unit,
    wherein the second fitting member provided at the opposite end of the brake hose attached to a front wheel of a vehicle is attached to the vertical shaft by the moving bracket, and wherein the second fitting member provided at the opposite end of the brake hose attached to a rear wheel of the vehicle is attached to the vertical shaft by the second fixing bracket.

2. The apparatus of claim 1, wherein the first mounting block comprises a bracket fixing plate to which the plurality of first fixing brackets attached and an elevating shaft of the vertical driving unit, and wherein the elevating shaft moves up and down a predetermined number of times by a predetermined distance due to the operation of the vertical driving unit.

3. The apparatus of claim 2, wherein the bracket fixing plate further comprises a plurality of screw fastening holes such that the first fixing bracket can be selectively attached to different positions of the bracket fixing plate.

4. The apparatus of claim 1, wherein the vertical shafts having the moving brackets attached thereto pivot left and right a predetermined number of times and by a predetermined angle due to the operation of the horizontal driving unit.

5. The apparatus of claim 1, wherein a layout setting system for setting the layout of the brake hose provided with the universal fitting members at both ends thereof comprises:

a testing unit configured to test the layout of the brake hose while brake hose fixing components manufactured using a 3D printer are mounted thereto;

a scanner configured to scan the layout of the brake hose and obtain layout data during the layout test of the brake hose; and a controller configured to compare the layout data of the brake hose obtained from the scanner with peripheral-components data to determine whether or not there is an interfering component and configured to correct data on interfering components and provide the same to the 3D printer.

6. A method for testing endurance of a brake hose of claim 5, the method comprising the steps of:

manufacturing fixing components of the brake hose using a 3D printer;

mounting the fixing components of the brake hose manufactured by the 3D printer and testing the layout of the brake hose;

scanning the layout of the brake hose to obtain layout data;

comparing the layout data of the brake hose with peripheral-components data to determine whether or not there is an interfering component, thereby obtaining correction data on interfering components; and if there is an interfering component, providing the corrected data to the 3D printer to remanufacture the fixing components of the brake hose, wherein the fixing components are first and second fitting members, a fixing bracket, and a moving bracket, and wherein the first and second fitting members are used universally for the fixing bracket and the moving bracket without distinguishing between the same according to a layout setting in which fastening surfaces of the first and second fitting members are formed at an angle based on angle data capable of preventing the occurrence of initial twist of the brake hose in implementation of the layout, wherein testing the layout of the brake hose comprises testing the layout of the brake hose while the second fitting member provided at the opposite end of the brake hose attached to a front wheel of a vehicle is attached to the vertical shaft by the moving bracket or testing the layout of the brake hose while the second fitting member provided at the opposite end of the brake hose attached to a rear wheel of the vehicle is attached to the vertical shaft by the second fixing bracket.

7. The method of claim 6, wherein the first and second fitting members have the same structure, and wherein each of the fastening surfaces is formed at an angle capable of preventing the occurrence of initial twist of the brake hose in setting the layout.

* * * * *